June 17, 1958  F. J. KOLAR, JR  2,838,797
METHOD OF AND APPARATUS FOR SEALING ELECTRICAL
COMPONENTS IN A THERMOPLASTIC
Filed May 6, 1954  3 Sheets-Sheet 1
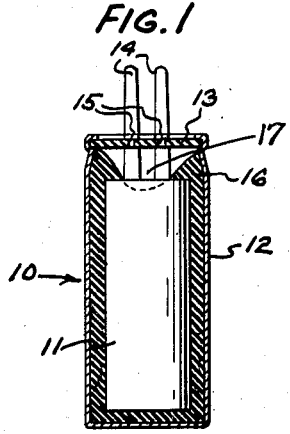
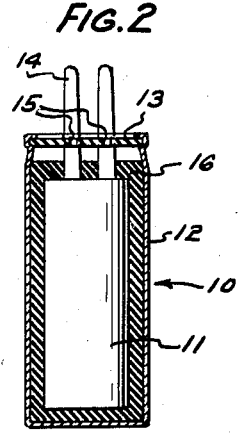
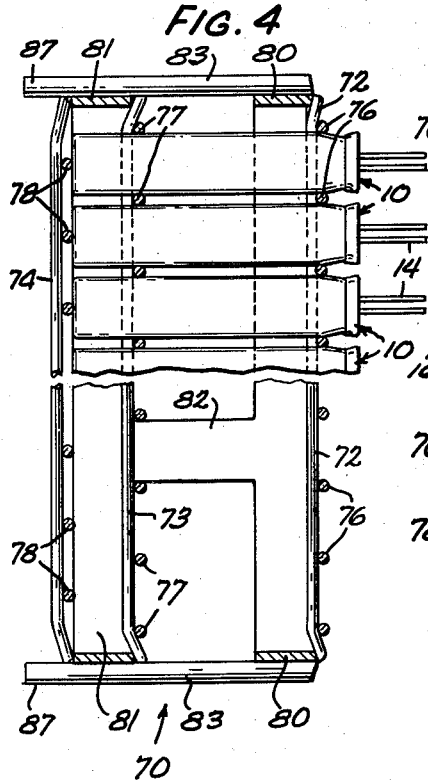
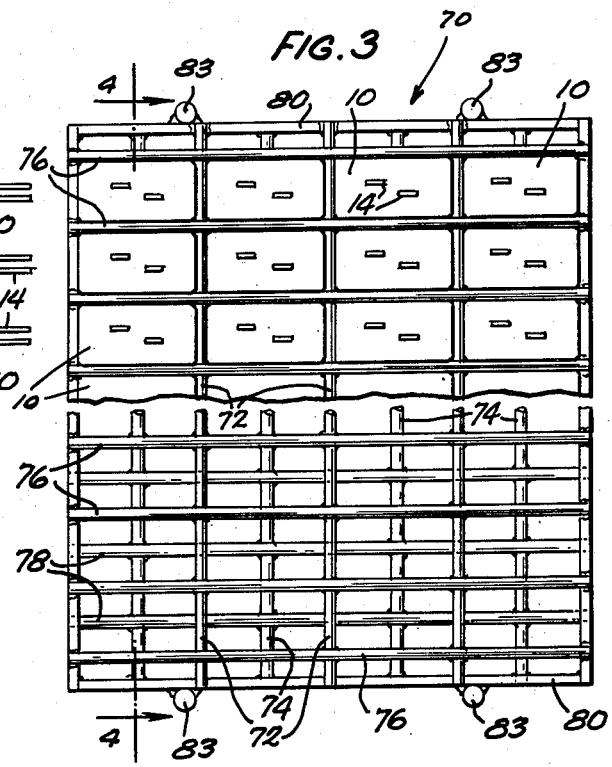
INVENTOR
F. J. KOLAR JR.
BY C. B. Hamilton
ATTORNEY

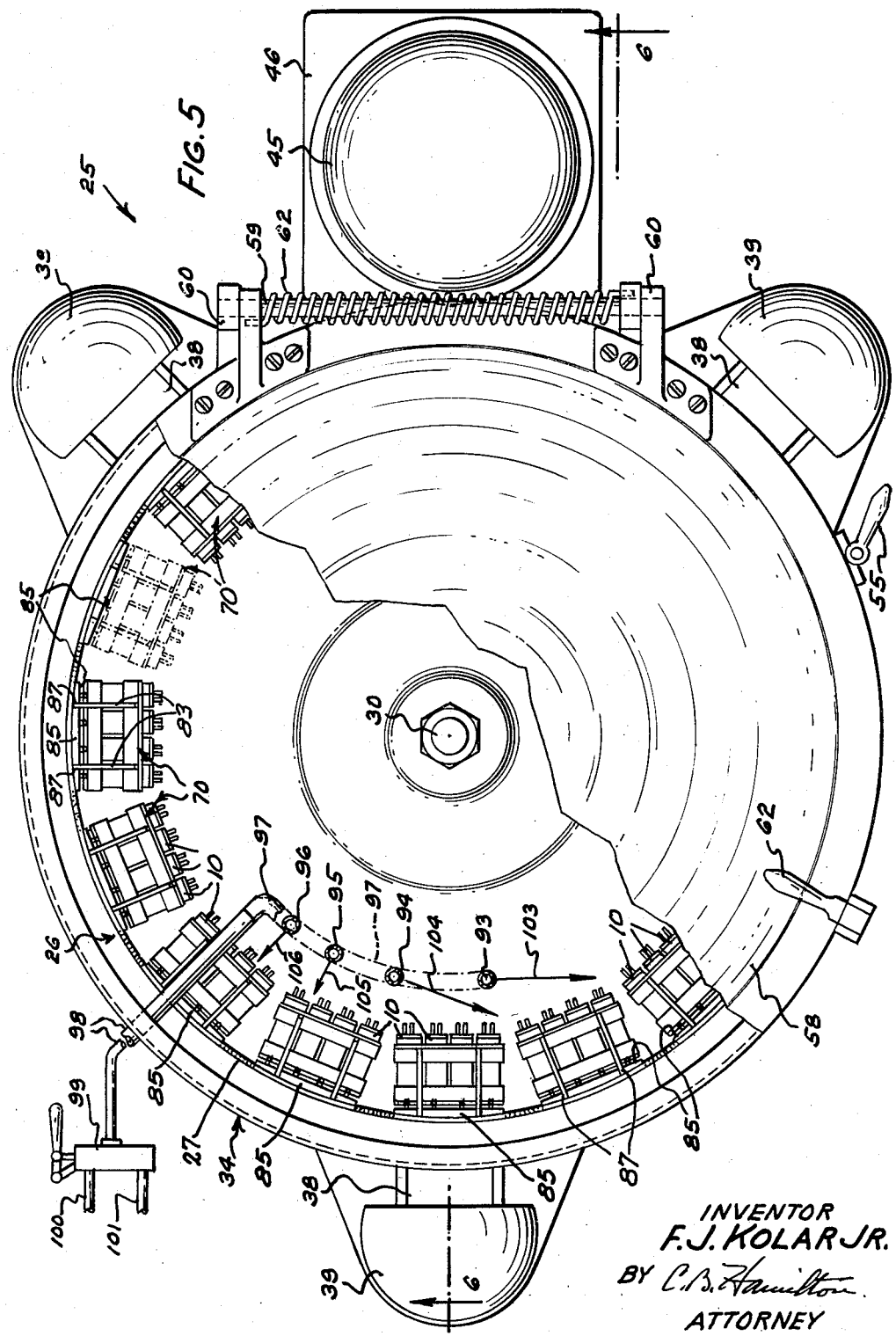

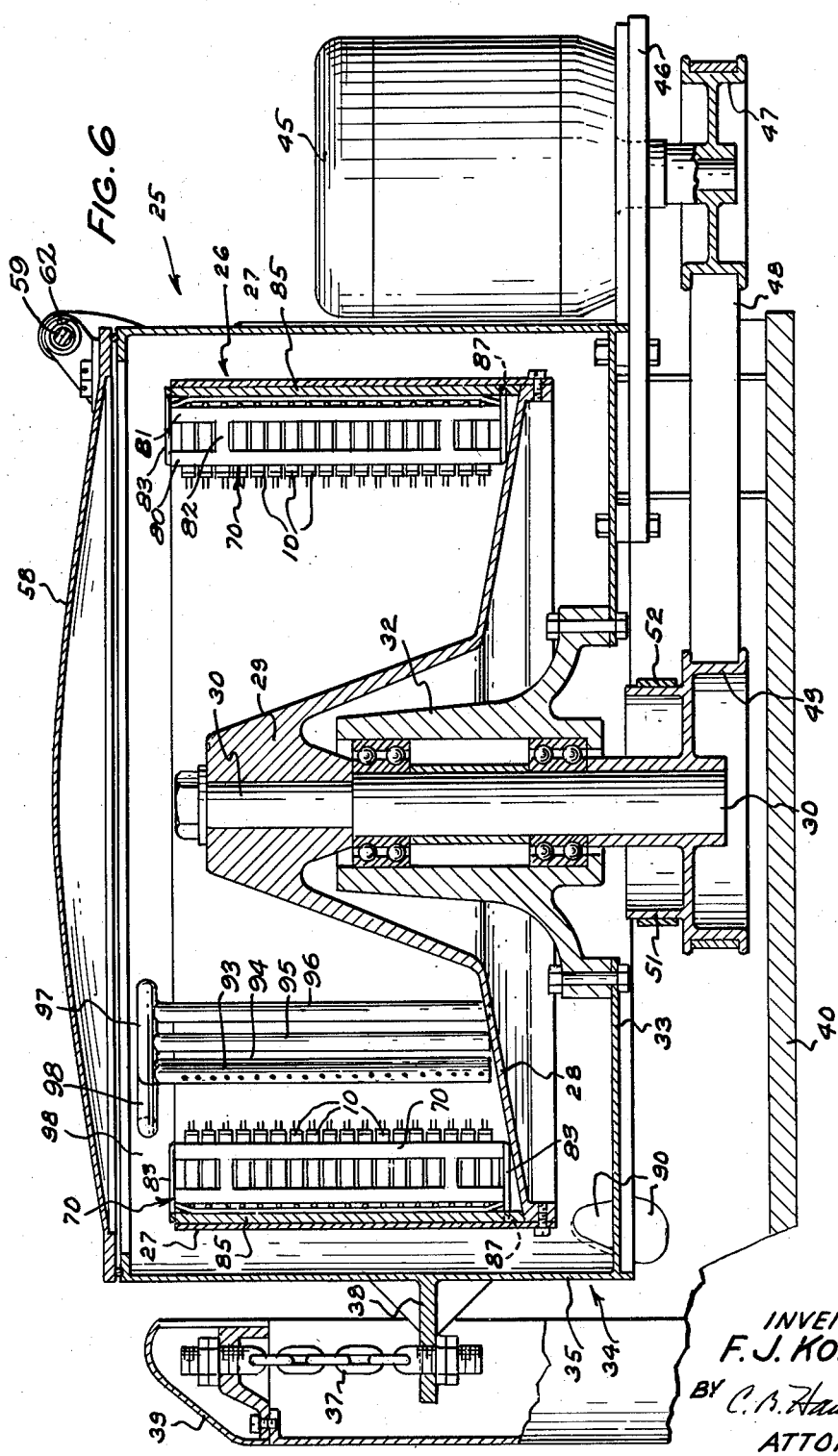

United States Patent Office 2,838,797
Patented June 17, 1958

2,838,797

METHOD OF AND APPARATUS FOR SEALING ELECTRICAL COMPONENTS IN A THERMOPLASTIC

Frank J. Kolar, Jr., Hinsdale, Ill., assignor to Western Electric Company, Incorporated, New York, N. Y., a corporation of New York Application May 6, 1954, Serial No. 428,053

6 Claims. (Cl. 18—26)

This invention relates to the manufacture of potted electrical components and the like and more particularly to a method of and apparatus for heating and compacting by redistributing thermoplastic insulating materials about electrical components to provide a moisture-proof seal.

An object of the present invention is to provide a centrifuging method of sealing potted electrical elements in thermoplastic insulating materials.

Another object of the invention is to provide a method of and apparatus for heating and redistributing a portion of the wax in potted capacitors to eliminate undesirable voids formed therein.

A method illustrating certain features of the invention may include the steps of placing in a chamber a plurality of capacitor units having capacitor elements enclosed in cans provided with perforations in one end thereof, evacuating the chamber, flowing melted wax into the chamber, applying air pressure to force the wax into the cans, draining the excess wax from the chamber, and cooling the cans to room temperature, which causes the wax to shrink and form voids therein which expose portions of the capacitor elements. The method of eliminating these voids includes placing the capacitor units in a centrifuge with the perforated ends of the cans disposed radially inwardly toward the axis of rotation, rotating the centrifuge to revolve the capacitor units, directing blasts of hot air onto the apertured ends of the revolving cans to melt the wax in the inwardly directed ends thereof and cause it to be urged radially outward into the cans to fill in the voids and completely cover the capacitor elements, and then finally cooling the capacitor units to freeze the wax around the capacitor elements in a tight moisture-proof seal.

An apparatus illustrating certain features of the invention for processing capacitor units potted in wax in cans may include an annular rotatable perforated basket, racks carried by said basket for supporting a plurality of capacitor units therein with a predetermined end of each of the capacitor units directed toward the axis of rotation, means for rotating the basket to rapidly revolve the capacitor units about said axis, means for directing a blast of hot air against the inner ends of the capacitor units to melt the wax adjacent said ends and permit the free movement thereof under centrifugal pressure to seal the capacitor elements within the cans, and means for directing a blast of cool air against the ends of the capacitor units for cooling and hardening the wax about said capacitor elements.

Other objects and advantages of the invention will become apparent by reference to the following detailed description and the accompanying drawings illustrating a preferred embodiment thereof, in which Fig. 1 is an elevational sectional view of a potted capacitor showing the wax with a void formed therein;

Fig. 2 is a view of a potted capacitor after it has been processed to eliminate the void therein;

Fig. 3 is a front elevational view of a rack for supporting a plurality of potted capacitors;

Fig. 4 is a sectional view of the rack taken on the line 4—4 of Fig. 3;

Fig. 5 is a plan view of the apparatus for centrifuging the capacitors; and

Fig. 6 is a vertical sectional view of the centrifuging apparatus taken on the line 6—6 of Fig. 5.

Referring to the drawings (Figs. 1 and 2) 10 represents a potted capacitor unit comprising a wound capacitor element 11 enclosed in a can 12 having a cover 13 for supporting the terminals 14 of the capacitor element and provided with a pair of apertures 15 through which melted wax 16 may be flowed thereinto. A plurality of cans 12 with the capacitor elements 11 therein are placed in a chamber, heated to predetermined temperature, the atmosphere is evacuated therefrom, and melted wax is then flowed into the chamber, and air pressure is then applied to fill the cans 12 through the apertures 15 in the end 13 of the cans. The excess wax is withdrawn from the chamber and the capacitor units are removed from the chamber and cooled. The wax 16 within the cans 12 shinks and hardens as it cools and forms relatively deep voids or cavities 17 therein which normally extend down to and uncover portions of the capacitor elements 11 and thus create potential moisture paths thereto.

The potted capacitor units 10 with the voids 17 formed in the wax are then placed in a centrifuge 25 with the apertured ends 13 directed toward the axis of rotation and are then revolved at a rapid rate, and while they are revolving jets of hot air are directed onto the inwardly directed end portions of the capacitor units to melt the wax 16 in the end portions thereof so that centrifugal force will cause the melted wax at the end of the can 12 to level off and cover up the end of the capacitor element 11 as shown in Fig. 2 and thus eliminate the voids 17.

The centrifuge 25 comprises an annular basket 26 having a cylindrical perforated wall 27 and a sloping bottom wall 28, the inner portion of which forms a hub 29 which is secured to a shaft 30. The shaft 30 is rotatably supported in a bearing bracket 32 mounted on a bottom wall 33 of a housing 34 which has a cylindrical wall 35 concentric with and in spaced relation to the cylindrical wall 27 of the basket 26. The housing 34 is supported for floating movement by a plurality of chains 37 connected at their lower ends to brackets 38 on the housing 34 and connected at their upper ends to posts 39 which extend upwardly from a base frame 40. A motor 45 mounted on a frame 46 which is secured to the bottom 33 of the housing 34 has a drive pulley 47 which is connected through a plurality of belts 48 to a drive pulley 49 fixed to the shaft 30 for rotating the basket 26. A brake drum 51 formed on the pulley 49 is engaged by a brake band 52, which is actuated through linkage including an operating handle 55 suitably supported on the housing 34 for stopping the rotation of the basket. A cover 58 which cooperates with the housing 34 to form an enclosure for the basket 26, is pivotally mounted on a shaft 59, the ends of which are supported in suitable bearing brackets 60 secured to the housing 34. A spring 61 encircling the shaft 59 serves to counterbalance the cover and aid in moving it to and from its open and closed positions and a plurality of clamping devices 62 serve to clamp the cover tightly in its closed position.

The capacitor units 10 are stacked in a plurality of racks 70 which line the inner side of the cylindrical wall 27 of the basket 26 and support the capacitor units 10 horizontally with the apertured ends 13 directed toward the axis of rotation thereof. The racks 70 may be secured to the basket 26 but preferably are removably supported therein in vertical position by the cylindrical wall 27 and the bottom wall 28 and may be used for supporting the capacitor units 10 during the potting thereof with wax and subsequent degreasing.

Each rack 70 comprises a plurality of longitudinally disposed wires 72, 73, and 74 welded to a plurality of transversely disposed wires 76, 77, and 78, respectively, intermediate their ends and welded at their ends to rectangular frames 80 and 81 formed from flat metal strips, the rectangular frames 80 and 81 being spaced apart by spacer members 82—82 welded to the side portions thereof and rods 83—83 welded to the end portions thereof. The wires of the rack form a plurality of pockets for receiving and supporting the capacitor units 10 in a plurality of rows in parallel relation to each other.

Flat seats 85 are provided on the inner face of the cylindrical wall 27 of the basket for supporting the flat wall of the racks 70 formed by the wires 74 and 78. The rods 86 have projecting end portions 87 which are engageable in notches or recesses in the seats 85 to aid in seating the racks in vertical position on the seats 85 and prevent them from sliding under start and stop inertia.

The seats 85 and the racks 70 are mounted in spaced relation to each other as shown in Fig. 5 and the walls 27 between the seats 85 are perforated to permit the free passage of air and wax therethrough as the basket rotates. The air passing from the basket 26 into the chamber formed by the housing 34 and the cover 58 is discharged therefrom through a spout or discharge opening 90 in the housing.

Jets of heated air from openings or ports in a plurality of pipes 93, 94, 95, and 96 are directed onto the inwardly disposed ends of the capacitor units 10 as they revolve with the basket for heating and melting the wax in the end of each of the cans whereby the melted wax, due to centrifugal force, is urged to the outwardly disposed end thereof into a compact mass which fully encloses the capacitor element 11 as indicated in Fig. 2 and eliminates the voids 17 previously formed therein. The pipes 93 and 96 are disposed vertically in spaced relation to the racks 70 and the ends of the capacitor units 10 therein, and the ends of the pipes are connected to a manifold 97, which in turn is connected to a pipe 98, a portion of which is disposed horizontally above the top of the basket 26 and passes through the wall 35 of the housing. As shown (diagrammatically) in Fig. 5 the pipe 98 is selectively connectible through a valve 99 to a pipeline 100 for supplying heated air under pressure, and a pipeline 101 for supplying cool air under pressure. The valve 99 has a neutral position cutting off the pipe 98 from both pipelines.

The rows of jet forming openings in the pipes 93—96 are arranged as indicated in Fig. 5 so that the direction of the air blast from the pipes 93 and 94 extends tangentially to the revolving movement of the capacitor units 10 and the apertures in the pipes 95 and 96 are disposed to direct the jets of air therefrom substantially radially. The flow of heated air from these pipes serve to heat the ends 13 of the cans and melt the wax adjacent thereto and in cooperation with the centrifugal force applied thereto to effect the redistribution of the wax and the elimination of the voids therein, and in addition thereto the jets 103 of heated air serve to melt and clean from the ends of the can the surplus wax which has adhered thereto from the wax potting operation. The tangential jets of hot air 103 and 104 serve to wipe the melted wax on the apertured ends of the can toward the trailing edge thereof where it tends to remain until the cans move into the path of the radial jets 105 and 106 which serve to blow it radially along the sides of the cans. Some of this wax is blown from the cans onto the seats 85 and the wall 27 of the basket and through the apertures therein and onto the wall 35 of the housing from which it is removed at intervals, and the wax remaining on the side walls of the cans may be removed by a subsequent degreasing operation.

In the processing of the potted capacitor unit 10 to effect the redistribution of the wax and the elimination of the voids 17 therein, the wax potted capacitor units 10 are assembled in the racks 70, and the racks are placed in the basket 26 in upright position against the seats 85 as shown in Fig. 5 with the capacitor units 10 supported thereby horizontally and substantially radially and with the apertured ends of the cans directed toward the axis of rotation. After the basket has been filled with the racks 70 the cover 58 is clamped tightly against the housing 34 and the motor 45 is started to effect the rapid rotation of the basket 26 in a clockwise direction as viewed from above. The valve 99 is actuated to connect the manifold with the pipeline 100 to cause the relatively high velocity jets of hot air to issue from the pipes 93—96 onto the apertured ends of the cans 12 to effect the melting and redistribution of the wax adjacent said ends and the elimination of the voids 17 therein, and the removal from the ends 13 of the cans the external wax adhering thereto. The valve 99 is then actuated to cut off the flow of hot air and to connect the manifold with the supply line 101 to effect the flow of cool air onto the inner ends of the cans 12 and the freezing of the wax 16 in its newly redistributed position. The flow of air is then shut off, the rotation of the basket 26 is stopped, and the trays of finished capacitor units 10 removed.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In the manufacture of potted capacitors wherein a capacitor is encased in a container having an apertured end and melted wax is forced into the container to cover and impregnate the capacitor and the wax is cooled and voids are formed therein which expose a portion of the capacitor to the atmosphere, a method of processing the capacitor to eliminate the voids therein which comprises rapidly revolving the container about an axis with the apertured end thereof directed toward said axis to apply centrifugal force to said wax, heating said apertured end of the container as it revolves to melt the wax adjacent said apertured end and cause it to flow evenly over the end of the capacitor and be compacted thereabout under the influence of said centrifugal force, and cooling the wax to freeze it to provide a moisture seal for the capacitor.

2. In the manufacture of potted capacitors wherein a capacitor is encased in a container having an apertured end and melted wax is forced into the container to cover and impregnate the capacitor and the wax is cooled and voids are formed which expose a portion of the capacitor to the atmosphere, a method of processing the capacitor to eliminate the voids therein which comprises rapidly revolving the container about an axis with the apertured end thereof directed toward said axis to apply centrifugal force to said wax, directing hot air against said apertured ened of the container as it revolves to melt the wax adjacent said apertured end and cause it to flow evenly over the end of the capacitor and be compacted thereabout under the influence of said centrifugal force, and directing cool air against the container to harden the wax therein.

3. A method of potting capacitors enclosed in containers having apertures in one end thereof which comprises placing the containers with the capacitors therein in a chamber, evacuating the atmosphere from said chamber, flowing melted wax into the chamber to cover the containers, applying air pressure to force the melted wax into the containers to impregnate and cover the capacitors therein, cooling the containers to solidify the wax, placing the capacitors in a centrifuge with the apertured ends of the containers directed toward the axis of rotation and rapidly revolving the capacitors, directing blasts of hot air against the inner end portions of the containers as they are revolving to melt the wax adjacent said ends to cause the melted wax to flow evenly over the inner ends of the capacitors for completely covering them under the influence of the centrifugal force, and blowing cool air onto the containers to freeze the wax and form a moisture seal around the capacitors.

4. A method of potting capacitors enclosed in containers having apertures in one end thereof which comprises placing the capacitors in a chamber, evacuating the atmosphere from said chamber, flowing melted wax into the chamber to cover the containers, applying air pressure to the melted wax to force the wax into the containers to impregnate and cover the capacitors therein, cooling the containers to solidify the wax, revolving the containers around an axis with the apertured ends of the containers directed toward the axis, heating the inner portions of the containers as they are revolving to melt the wax adjacent said apertured ends and cause the melted wax to flow evenly over the inner ends of the capacitors for completely covering them under the influence of centrifugal force, and cooling the cans to freeze the wax and form a moisture seal around the capacitors.

5. An apparatus for processing capacitors potted in wax in cans each of which has an apertured end comprising an annular basket, means mounting said basket for rotation about an axis, means for supporting a plurality of potted capacitors in said basket with the apertured ends of the cans facing said axis, means for rotating said basket to revolve said cans about said axis and apply centrifugal force to the wax therein, a stationary nozzle disposed adjacent to the path of travel of the potted capacitors for directing jets of air onto the apertured ends of the cans as they revolve, a first pipeline connectible to a supply of hot air under pressure, a second pipeline connectible to a supply of cool air under pressure, and means operable to selectively connect the nozzle to either one of said pipelines.

6. An apparatus for processing capacitors potted in wax in cans each of which has an apertured end comprising an annular basket, means mounting said basket for rotation about an axis, means for supporting a plurality of potted capacitors in said basket with the apertured ends of the cans directed towards said axis, means for rotating said basket to rapidly revolve said cans about said axis and apply centrifugal force to the wax therein, a stationary manifold having a plurality of pipes extending therefrom adjacent to the path of travel of the capacitors and provided with perforations therein for directing streams of air onto the apertured ends of the cans as they revolve, and means for selectively connecting said manifold to a supply of hot compressed air for heating the cans and to a supply of compressed air for cooling the cans, one of said pipes having perforations therein directed transversely of a plane through the pipe and said axis for directing streams of hot air tangentially against the apertured ends of the cans for melting the wax in the cans adjacent said ends and for melting and wiping the external wax from the outer surfaces of said apertured ends onto the sides of the cans, and one of said pipes having perforations therein directed radially from said axis for directing streams of hot air radially to wipe the external wax from the sides of the cans.

References Cited in the file of this patent

UNITED STATES PATENTS

| | | |
|---|---|---|
| 1,706,816 | Pickard | Mar. 26, 1929 |
| 2,158,981 | Collins | May 16, 1939 |
| 2,165,936 | Miller | July 11, 1939 |
| 2,346,784 | Pollack | Apr. 18, 1944 |
| 2,351,321 | Compton | June 13, 1944 |
| 2,536,692 | Miller | Jan. 2, 1951 |
| 2,633,605 | Brucker | Apr. 7, 1953 |

FOREIGN PATENTS

| | | |
|---|---|---|
| 330,516 | Great Britain | June 5, 1930 |